UNITED STATES PATENT OFFICE.

CYRUS FIELD WILLARD, OF SAN DIEGO, CALIFORNIA.

PROCESS FOR DEVULCANIZING RUBBER.

1,322,077.      Specification of Letters Patent.      Patented Nov. 18, 1919.

No Drawing.      Application filed May 31, 1917. Serial No. 171,923.

*To all whom it may concern:*

Be it known that I, CYRUS FIELD WILLARD, a citizen of the United States, residing at San Diego, county of San Diego, and State of California, have invented a new and useful Process for Devulcanizing Rubber, which invention is set forth in the following specification.

This invention relates to a process of devulcanizing vulcanized rubber by extracting sulfur that was combined with the rubber by the heat of vulcanization by using a liquid hydro-carbon of a viscid and gummy nature, such as wood or coal tar, which has a stronger affinity for sulfur than rubber has, and which under proper conditions of heat and moisture will liberate said combined sulfur so that it and the liberating agent can be washed away by some strong detergent or cleansing solution.

The vulcanization of rubber consists, simply stated, in the union of sulfur with rubber at the proper heat and it has been a moot question for years as to whether the sulfur was in mechanical or chemical union with the rubber.

My process takes as its working hypothesis, the mechanical union of sulfur with the rubber, and I have devulcanized rubber many hundreds of times in experiments extending over twenty years acting on the principle outlined and by using the process which I will now describe.

My process consists, briefly, of presenting the vulcanized rubber, properly cleansed and with the free sulfur generally found in vulcanized rubber, removed, to the action of a hydrocarbon which is of a coarser or grosser nature than rubber and has a stronger affinity for sulfur than is possessed by the rubber and which therefore under proper conditions of heat, moisture, etc., will extract sulfur from the rubber and take the sulfur to itself leaving the rubber practically free from " combined " sulfur. After this is done, I use some strong detergent or cleansing agent that will remove the liberating agent used and allow it and the liberated sulfur and other substances, fillers, compounds, etc., to be washed away.

Wood tar is the liberating agent I use by preference although any other kind of tar or liquid hydro-carbon of a viscid and gummy nature may be used and hence I do not intend to limit myself to wood tar alone. I am aware that wood tar, coal tar and coal tar derivatives have been used in various ways in attempted devulcanizing and reclaiming processes but not in the manner nor for the purpose in which tar is used in my process, which is as follows:—

First I cleanse the vulcanized rubber by soaking it for a number of hours, varying according to the condition of the rubber, in alcohol, ethyl or methyl but preferably the latter on account of cheapness. This loosens up the dirt, outside coating, and the excess or free sulfur and above all acts as a de-resinator. Then the rubber is boiled up in clear water to get rid of the remaining traces of the alcohol as well as the other matter which has been loosened up by the alcohol after which it is washed in some detergent or cleansing solution preferably in a weak solution of caustic soda, caustic potash or lye. A three per cent. solution of caustic soda has been found to be suitable for this purpose.

After washing out the caustic soda solution, (which has been used for the purpose of removing free sulfur from rubber almost from the time Goodyear discovered vulcanization) I place the vulcanized rubber either whole, cut up in coarse pieces or finely divided in a vessel with tar and water.

I use in the proportion of a pound of tar to a pound of vulcanized rubber in a gallon of water and boil for two hours or more according to the condition of the rubber. This tar may be used several times without adding new tar.

After the rubber has boiled the proper length of time with the tar, or until more or less of the " combined " sulfur of vulcanization is in a liberated state where it can be washed out, the rubber is washed in a detergent solution preferably a weak solution of (say from one to three per cent.) caustic soda or lye, (sodium hydroxid or potassium hydrate) to remove the tar which carries with it the liberated " combined " sulfur and other matter such as fillers, compounds and adulterants. It may be necessary to give it several washings in order to get rid of the tar and thoroughly cleanse the rubber.

When the rubber has been cleansed from the tar it may be necessary to give it several washings in plain hot water to get rid of impurities not necessary to specify which can be done in the regular washer used in rubber factories. It is then dried slowly by natural heat or such other means as may seem best.

Before final drying, it may be advisable to further deresinate the devulcanized product depending on the character of rubber used, and this I accomplish by soaking it for two or more hours according to character of material used, in wood alcohol.

While the process is simple and inexpensive and does not injure the rubber but on the contrary seems to make it tougher than when first used, the main thing necessary is to obtain the proper proportion of tar to water used as the liquid must not be too thin nor too thick. This proportion varies according to the different kinds of rubber used with the varying compounds therein and the thickness of material put through the tar liquid. Sometimes it may be necessary to add water as the water boils away (if used in an open vessel) in order to keep the liquid of the proper consistency and sometimes it may be necessary to add tar, depending on the rubber to be devulcanized but this can be easily determined by experience, as the liquid should have the appearance of brown or black yeast breaking in bubbles as it boils and should boil well and steadily and not too hard.

Having thus described my invention so that it can be used by one skilled in the art, what I claim as new and desire to secure by Letters Patent, is:—

1. The process of devulcanizing vulcanized rubber which comprises boiling it with a liquid of which a large portion is a hydrocarbon of a viscid and gummy nature, said hydrocarbon forming a yeasty froth on the surface of the liquid and having an affinity for sulfur under the conditions created greater than the lessened affinity for sulfur possessed by the rubber, whereby combined sulfur will be liberated from the rubber.

2. The process of devulcanizing vulcanized rubber which comprises treating it, at or above the temperature of boiling water, with a mixture of water and a suitable hydrocarbon of a viscid or gummy nature in quantity sufficient to make a viscid or gummy solution that when boiling will produce a yeast like froth on the liquid, whereby combined sulfur will be liberated, and then removing the hydrocarbon mixture and liberated sulfur.

3. The process of devulcanizing rubber which comprises treating it with a sulfur liberating agent the major portion of which consists of tar and water.

4. The process of devulcanizing rubber which comprises treating it with a liquid agent composed wholly of water and tar.

5. The process of devulcanizing rubber which comprises boiling it with a liquid composed wholly of water and tar.

6. The process of devulcanizing vulcanized rubber which comprises boiling it with a mixture of water and a hydrocarbon of a viscid and gummy nature, non-volatile at the temperature employed, and in quantity sufficient to form a solution which when boiled develops a yeast-like froth on the surface of the mixture, adapted to take up combined sulfur liberated from the rubber without dissolving the rubber.

7. A process of devulcanizing rubber which comprises cleaning the rubber by the action of alcohol, removing free sulfur, and treating the rubber with a suitable hydrocarbon to liberate combined sulfur therefrom.

8. A process of devulcanizing rubber which comprises cleaning the rubber by the action of alcohol, removing free sulfur, treating the rubber with tar to liberate combined sulfur therefrom, and thereafter treating the rubber to remove the tar, liberated sulfur, etc.

9. A process of devulcanizing rubber which comprises treating it with alcohol, boiling it in water, washing with a suitable cleansing solution, boiling it with water and a hydrocarbon having a greater affinity for sulfur than is possessed by the rubber, and removing the liberated sulfur, etc.

10. The process of devulcanizing devulcanized rubber which comprises cleaning the rubber, boiling it with a mixture of tar and water, the tar being in quantity sufficient to combine with all combined sulfur liberated from the rubber by the action of the tar thereon, and removing the mixture of tar and water entraining the liberated sulfur.

11. A process of devulcanizing rubber which comprises treating it with a suitable hydrocarbon in quantity sufficient to liberate combined sulfur and then subjecting it to the action of a detergent solution to remove the hydrocarbon, etc.

12. A process of devulcanizing rubber which comprises treating it with tar in the presence of heat and moisture and then subjecting it to the action of a detergent solution to remove the tar, etc.

13. A process of devulcanizing rubber which comprises treating it with tar in the presence of heat and moisture and then boiling it with a detergent solution.

14. A process of devulcanizing rubber which comprises boiling it with tar in the presence of water, and then washing the mass in a detergent solution.

15. A process of devulcanizing rubber which comprises boiling it with a substantially equal amount by weight of a suitable hydrocarbon in the presence of water and subsequently removing the hydrocarbon from the rubber.

16. A process of devulcanizing rubber which comprises boiling it with a substantially equal amount by weight of tar in the presence of water and subsequently removing the tar.

CYRUS FIELD WILLARD.

Witnesses:
    Lou B. Mathews,
    Chas. W. Parker, Jr